United States Patent [19]
Hooke et al.

[11] Patent Number: 5,637,419
[45] Date of Patent: Jun. 10, 1997

[54] UP AND THROUGH BATTERY INTERCELL WELD

[75] Inventors: John W. Hooke; Mary J. F. Elwing, both of Warrensburg, Mo.

[73] Assignee: Hawker Energy Products, Inc., Warrensburg, Mo.

[21] Appl. No.: 593,584

[22] Filed: Jan. 30, 1996

[51] Int. Cl.⁶ .................................................. H01M 2/29
[52] U.S. Cl. ........................ 429/160; 429/185; 29/623.2
[58] Field of Search ............................ 429/160, 161, 429/163, 185, 175, 176; 29/623.2

[56] References Cited

U.S. PATENT DOCUMENTS

| | | | |
|---|---|---|---|
| 3,600,232 | 8/1971 | Daguenet | 429/160 |
| 3,803,378 | 4/1974 | Pearson et al. | 429/160 X |
| 4,221,850 | 9/1980 | Attinger et al. | 429/160 |
| 4,724,190 | 2/1988 | Siga et al. | 429/158 |

*Primary Examiner*—Anthony Skapars
*Attorney, Agent, or Firm*—Lorusso & Loud

[57] ABSTRACT

An up-and-through battery intercell connection for electrochemical batteries or cells is disclosed featuring battery partition wall extensions formed on battery partition walls located within a battery container through which lead intercell connector nuggets are secured to provide electrical connection between battery intercells. A battery container top is formed with recesses to accept the battery partition wall extensions. The container top is further formed with adhesive channels to accept a paste adhesive that allows the battery container top to be secured to the battery container without having to invert the battery during manufacture.

20 Claims, 5 Drawing Sheets

UP AND THROUGH BATTERY INTERCELL WELD

BACKGROUND OF THE INVENTION (1) Field of the Invention

This invention relates to intercell connections for electrochemical cells and more particularly to such intercell connections for lead-acid batteries.

(2) Description of Related Art

A typical electrochemical battery is divided into cells with partition walls that are molded into the battery container. Each cell contains at least one pair of oppositely charged electrode plates, at least one separator and electrolyte. To connect the cells together, there are essentially two approaches presently utilized by the battery manufacturing industry.

The first approach involves welding together two lead connectors situated on either side of a partition wall. The weld is made by penetrating the partition wall. The hole made in the partition wall is mechanically sealed by the displacement of lead from the two connectors which form a intercell connection nugget. This mechanically derived seal prevents battery acid leakage through the weld/partition wall interface. This is known as a through-the-partition weld.

The second approach involves welding the connectors together over the top ends of the partitions. After the welds are made, the cells are sealed with an epoxy. This is known as an over-the-partition weld.

Though each approach has advantages, each also has its share of drawbacks. The through-the-wall weld approach is cost effective and can be produced with standard battery weld equipment. Unfortunately, in order to have uniform, effective heat sealing, the heat seal has to be restricted to a common plane. The weld is formed below this plane on the partition walls. Above this plane is an area known as head space. Battery pressure release valves, terminals and passive short protection are located in the head space. However, due to the heat seal restriction, the weld cannot be formed in the head space thereby resulting in a waste of limited head space. To accommodate the weld and the components located in the head space, the head space has to be made excessively large.

The over-the-partition weld solves the wasted head space problem since the weld connections are made in the same head space occupied by the battery valves, terminals and passive short protection. However, this approach is more costly in terms of equipment and ease of manufacture. To accomplish this weld, nonstandard equipment has to be used. To create a hermetic seal between the cells, a low viscosity, self-leveling epoxy has to be used to encapsulate the welds. This operation has to be performed with the battery oriented on the manufacturing line in an inverted position.

Accordingly, there is a need in the industry for a cost effective approach to connect battery intercells without adding head space and without having to invert the battery during manufacture.

SUMMARY OF THE INVENTION

It is therefore, an object of the present invention to provide a battery intercell connection that allows the efficient use of battery head space. Another object of the invention is to eliminate heat seal variation. It is a further object of the present invention to provide a battery intercell connection that can be manufactured using standard battery weld equipment. A still further object of the present invention is to provide a battery intercell connection that is cost effective and does not require inversion of the battery during the manufacturing process.

The invention comprises a container with at least one partition wall that has at least one partition wall extension projecting from the open end of the container. A weld is made through the partition wall extension which is located in the same head space occupied by battery valves, terminals and passive short protection.

The container has a top that is formed with cavities to receive the container partition wall extensions. The cavities are formed between the valves and terminals to minimize the amount of head space needed by making efficient use of the available head space. The top is further formed with channels to allow a sealing adhesive to flow around the connecting portions of the battery container and battery top.

A paste adhesive such as MA330 Methacrylate adhesive is used to seal the container and top. The high viscosity adhesive is dispensed into the bottom surface of the top which is then placed on the upright battery. The adhesive fills any gaps between the battery container and top.

The above and other features of the invention, including various novel details of construction and combinations of parts, will now be more particularly described with reference to the accompanying drawings and pointed out in the claims. It will be understood that the particular intercell connection embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Preferred embodiments of the invention will be illustrated in conjunction with the accompanying drawings in which like numerals designate like parts, and in which.

DESCRIPTION OF THE PREFERRED EMBODIMENT

Although the invention is broadly applicable to various types of electrochemical cells and batteries, the detailed description will apply to a normally sealed or "valve- "regulated" lead-acid battery of the starved electrolyte type, in which gases generated internally namely oxygen are recombined within the battery on charge and overcharge, without significant loss of weight (electrolyte) over its useful life (see U.S. Pat. No. 3,862,861 to McClelland et al.).

Figure 1:
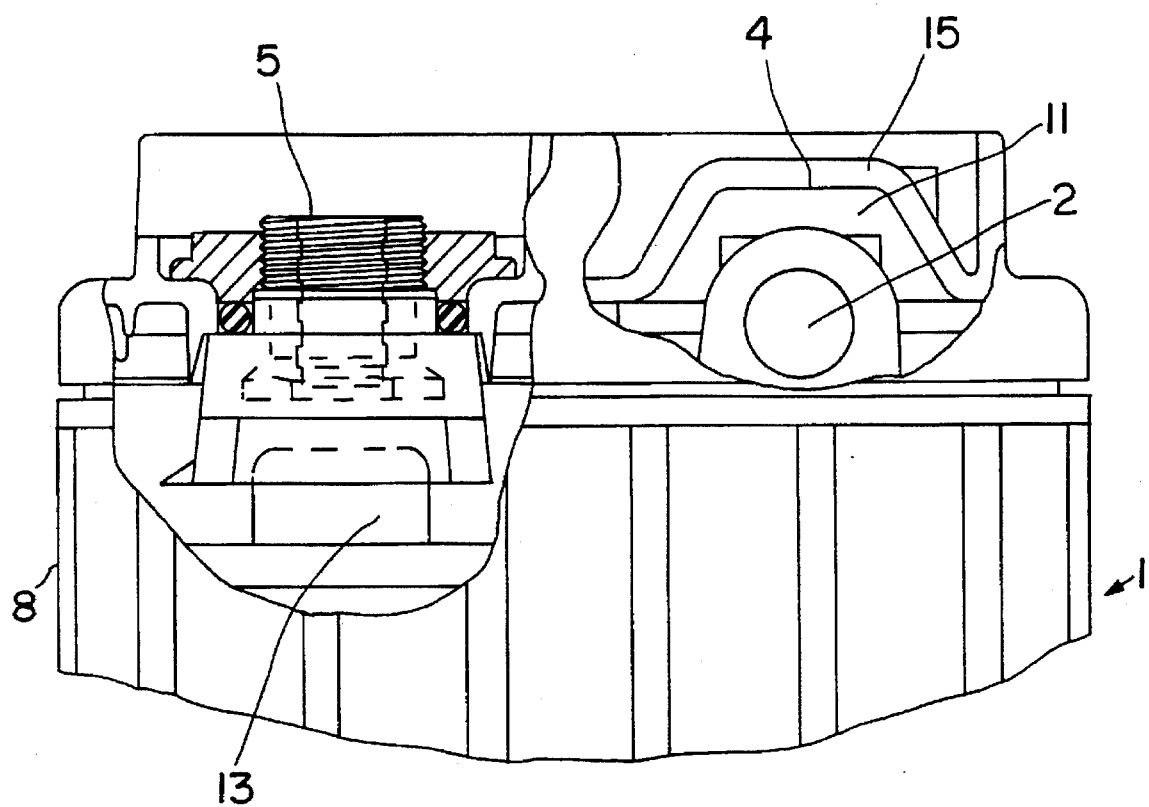
FIG. 1 is an elevational, partial sectional and broken away view of a battery container, battery top and intercell connection construction made in accordance with one embodiment of the claimed invention.
Figure 2:
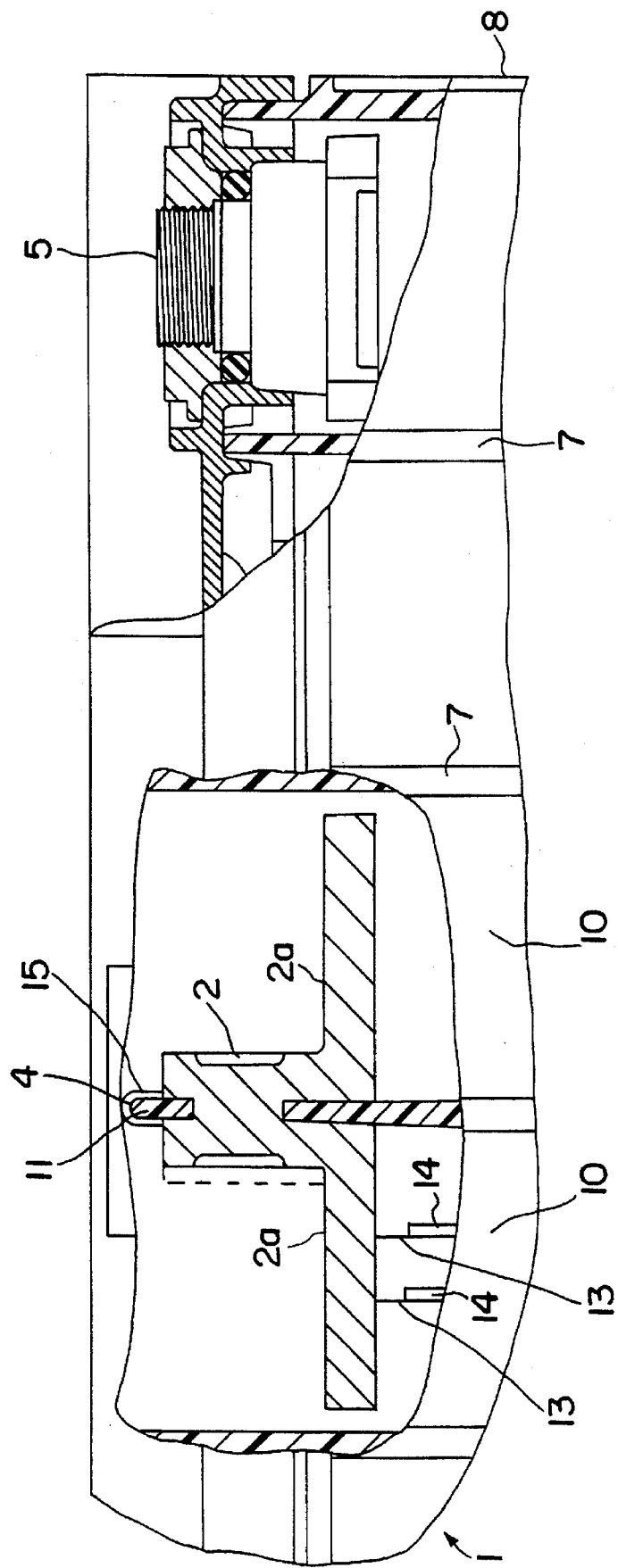
FIG. 2 is an elevational, partial sectional and broken away view of a battery intercell connection construction made in accordance with one embodiment of the claimed invention.

Referring to FIGS. 1 and 2, in a preferred embodiment, battery container 1 is molded with exterior walls 8 and partition walls 7 which are situated within the battery container 1 so that battery intercells 10 are created by the combination of the partition walls 7, the exterior walls 8 and the bottom of the battery container 1. The battery container 1 can be made of any material with high heat resistance and low moisture content such as ABS, PVC or NORYL. The partition walls 7 are preferably molded so that the partition walls 7 extend the full width or length of the battery container 1 depending on the orientation of the partition walls 7 in relation to the length and width dimensions of the battery container 1. The partition walls 7 also preferably extend the full height of the exterior walls 8 so that the top edge of the partition walls 7 occupy the same plane as the top edge of the exterior walls 8.

At selected positions, partition walls 7 are formed so that sections of the partition walls, partition wall extension 11, extend above the plane occupied by the top edges of the partition walls 7 and exterior walls 8. Partition wall extension 11 can be situated between any two points on partition walls 7. Preferably, one partition wall extension 11 is formed on each partition wall 7 so that adjacent intercells 10 can be electrically connected. For ease of manufacture, partition wall extensions 11 are preferably positioned on the partition walls 7 so that partition wall extensions 11 located on adjacent partition walls 7 alternate between two selected positions to form two rows of partition wall extensions 11.

Figure 3:
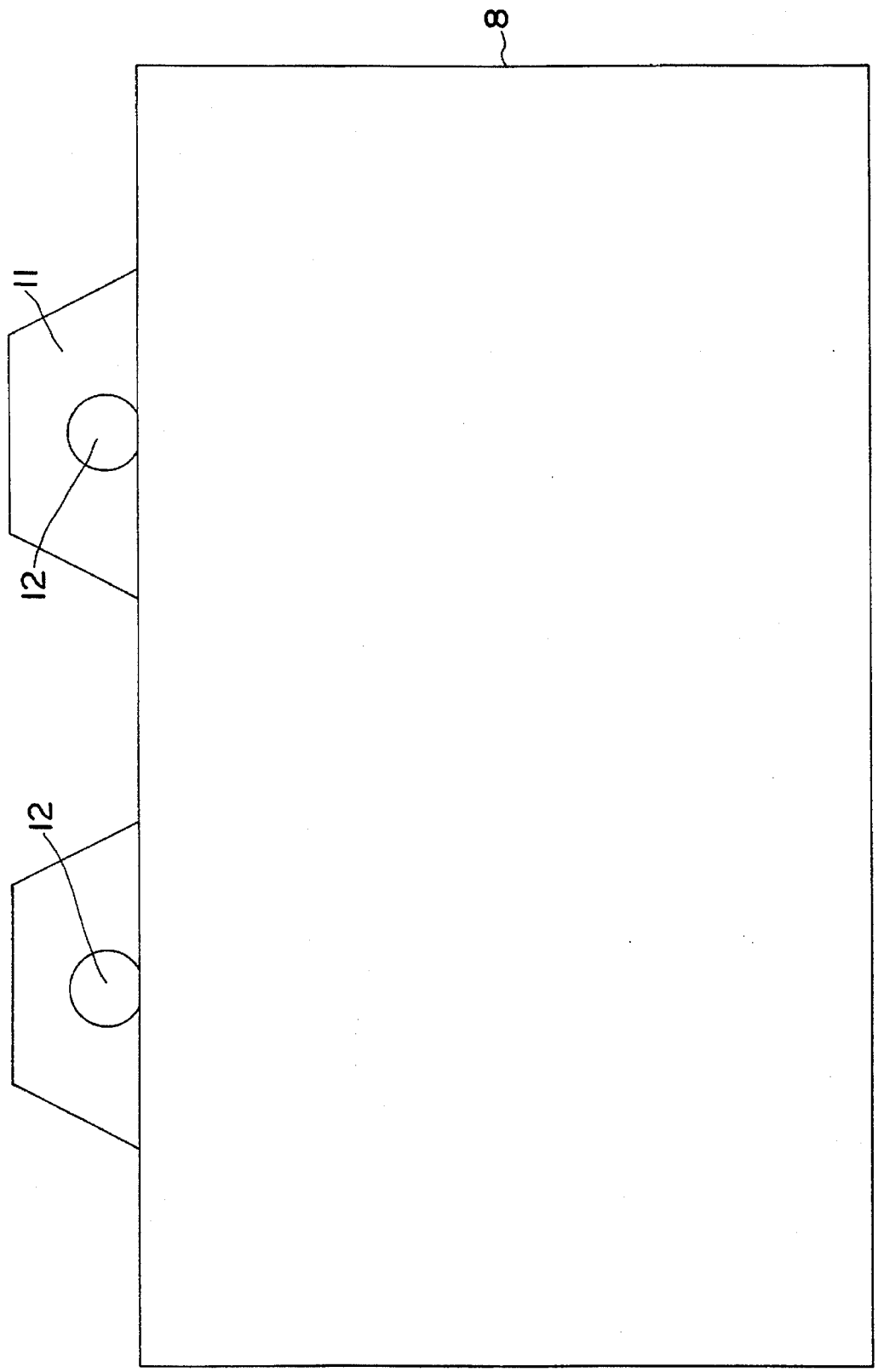
FIG. 3 is an elevational view of a battery container made in accordance with one embodiment of the claimed invention.

Referring to FIG. 3, the partition wall extensions 11 each have an orifice 12 that can be formed through molding or by boring through the partition wall extensions 11 with a drill, punch and die, or other boring implement. Orifices 12 are located on partition wall extensions 11 so that the structural integrity of partition wall extensions 11 is not functionally compromised. As a general rule, orifices 12 are located lower on partition wall extensions 11 as the size of orifices 12 are increased. Preferably, for ease of manufacture, the orifices 12 are positioned so that alternating orifices 12 are aligned within the partition wall extension rows.

A connection nugget 2 which provides electrical connection between adjacent battery intercells 10 is formed by placing angular, L-shaped pieces of lead or lead alloy 2a on each side of the partition wall extension 11. The L-shaped pieces 2a, prior to being welded together, are connected to connector tabs 13 which project from electrode plates 14. Pieces 2a can be formed in a variety of shapes including round or oval. Preferably, pieces 2a are elongated to increase conductivity without impinging on available head space. The two L-shaped pieces 2a which comprise the Through-The-Wall-Weld nugget 2 are welded together with standard welding equipment so that the L-shaped pieces 2a which comprise the connection nugget 2 are connected through orifice 12 without damaging the structural integrity or shape of the partition wall extension 11. Preferably, the edges of the connection nugget 2 do not extend beyond the edges of the partition wall extensions 11. Connection nugget 2 then completes the connection of intercells 10.

Figure 4:
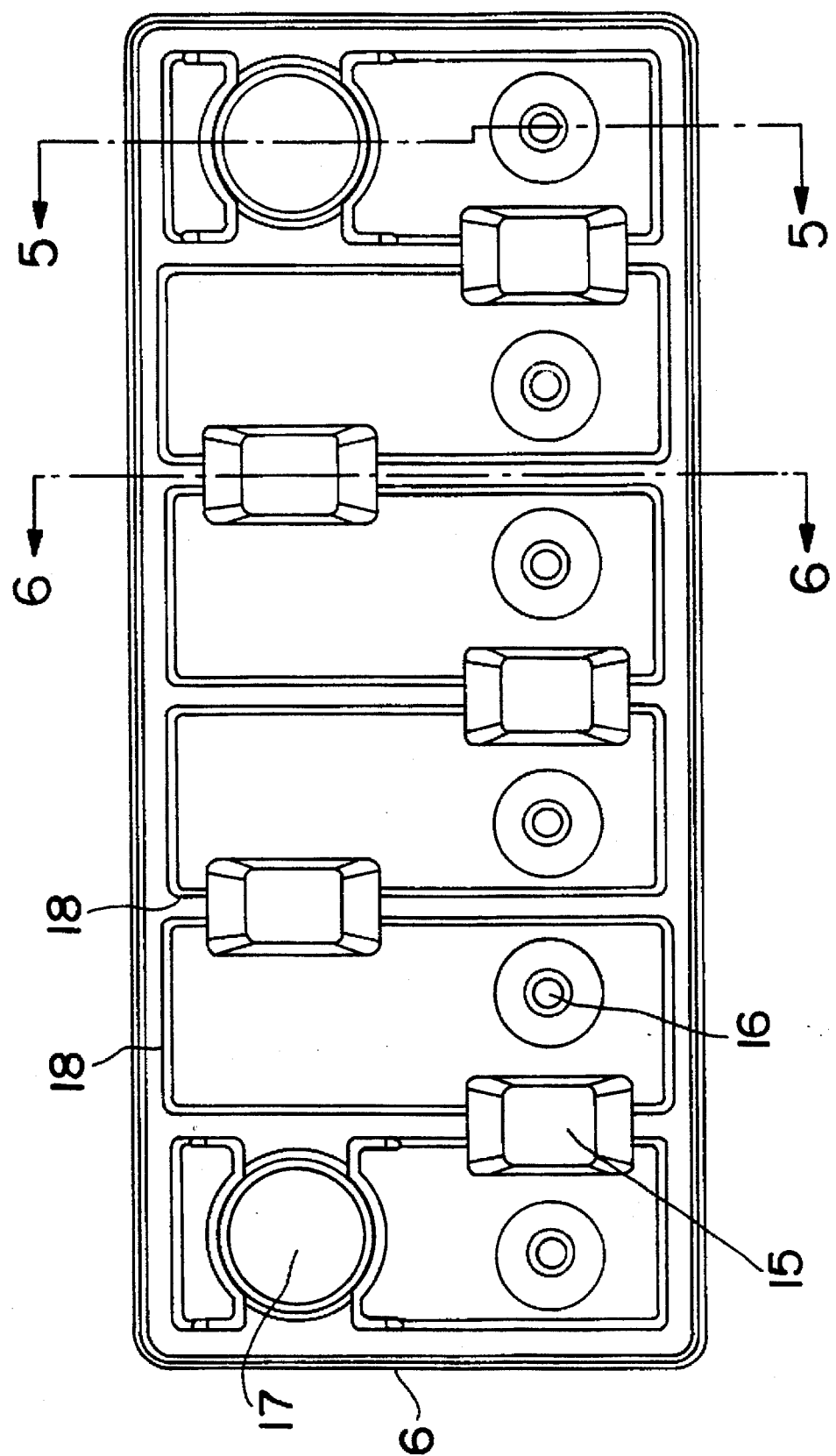
FIG. 4 is a bottom side view of a battery container top made in accordance with one embodiment of the claimed invention.
Figure 5:
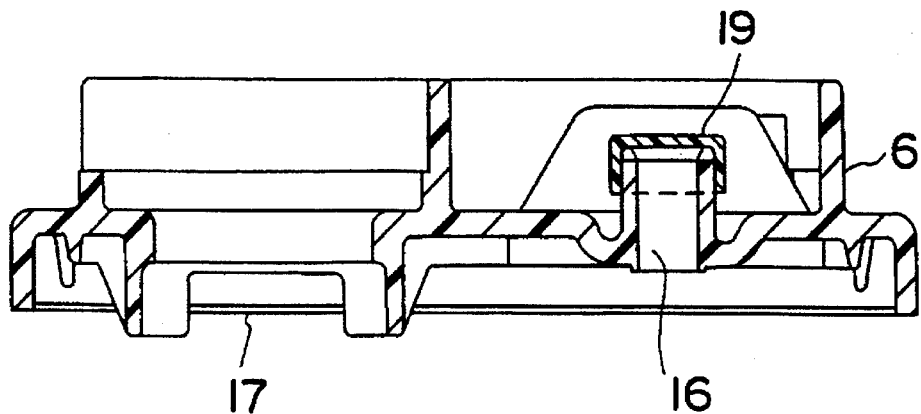
FIG. 5 is an elevational, partial sectional and broken away view of a battery inner top made in accordance with one embodiment of the claimed invention taken along line A—A of FIG. 4.
Figure 6:
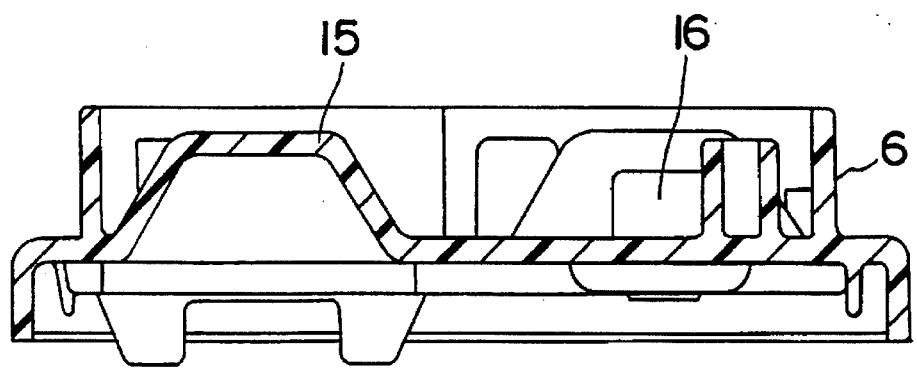
FIG. 6 is an elevational, partial sectional and broken away view of a battery inner top made in accordance with one embodiment of the claimed invention taken along line B—B of FIG. 4.

Referring to FIGS. 4–6, container top 6 is formed and adapted to receive the top edges of exterior walls 8 of battery container 1. Recesses 15 are formed on a bottom surface of container top 6 and are positioned to accept partition wall extensions 11. Recesses 15 are sized and shaped to conform to, and accept the shape of the partition wall extensions 11. Recesses 15 are located in the same plane and head space as acid fill holes 16 and terminal through hole 17 that are situated on the container top 6. Adhesive channels 18 are also formed on the bottom surface of container top 6 to receive a paste adhesive 4.

To ensure a tight seal between the container top 6 and battery case 1 and the intercells 10, paste adhesive 4 such as MA330 Methacrylate Adhesive (ITW adhesives, Danvers, Mass.), is coated onto the edges of the container top 6 including the recesses 15 adapted to receive the partition wall extensions 11 and adhesive channels 18. The past adhesive must be sufficiently viscous to withstand flowing off the container top 6 after the container top 6 is inverted to be placed on battery case 1. The container top 6 is then inverted and placed onto battery case 1 with the application of pressure to ensure good adhesion between the container top 6 and battery container 1. Thus, each intercell which will be filled with acid through acid fill holes 16, will be sealed off from the environment and from every other intercell. After the intercells 10 have been filled with acid, Bunsen valves 19 are placed on the acid fill holes 16. By using paste adhesive 4 to seal the interface between battery container 1 and container top 6, the entire process of placing the container top 6 on battery container 1 is accomplished without having to invert battery container 1 during manufacture.

While representative embodiments have been shown for the purpose of illustrating the invention, it will be apparent to one skilled in the relevant art that changes and modifications can be made without departing from the spirit and scope of the invention.

Having thus described our invention, what we claim as new and desire to secure by United States Letters Patent is:

1. An intercell connection assembly comprising:
    a container, said container having at least one partition wall therein;
    at least one partition wall extension projecting from a top edge of said at least one partition wall and having portions defining an extension orifice;
    a connection nugget secured to either side of said at least one partition wall extension through said extension orifice;
    a container top with at least one recess in a bottom surface thereof, said recess being adapted to receive said partition wall extension; and,
    an adhesive for securing and sealing said container top to said container.

2. The intercell connection assembly of claim 1 including a plurality of partition wall extensions located on a plurality of adjacent partition walls wherein said plurality of partition wall extensions alternate among at least two selected positions on said plurality of partition walls to form at least two rows of said partition wall extensions.

3. The intercell connection assembly of claim 1 wherein said at least one partition wall extension extends above the plane occupied by the top edge of said at least one partition wall.

4. The intercell connection assembly of claim 1 wherein said connection nugget comprises at least two pieces that are positioned on each side of said at least one partition wall extension, said at least two pieces being welded together through said extension orifice to form said connection nugget whereby said connection nugget provides electrical connection between intercells formed on each side of said at least one partition wall.

5. The intercell connection assembly of claim 4 wherein said at least two pieces are angular and L-shaped.

6. The intercell connection assembly of claim 4 wherein said at least two pieces are oval shaped.

7. The intercell connection assembly of claim 1 wherein the edges of said connection nugget do not extend beyond the edges of said at least one partition wall extension.

8. The intercell connection assembly of claim 1 wherein said extension orifice is located on said at least one partition wall extension to maintain the structural integrity of said at least one partition wall extension.

9. The intercell connection assembly of claim 1 wherein said extension orifice is sized to maintain the structural integrity of said at least one partition wall extension.

10. The intercell connection assembly of claim 1 wherein said battery container is made with a material with high heat resistance and low moisture content.

11. The intercell connection assembly of claim 1 wherein said battery container is made from a material selected from the group consisting of ABS, NORYL, PVC and combinations thereof.

12. The intercell connection assembly of claim 1 wherein said connection nugget is made of lead.

13. The intercell connection assembly of claim 1 wherein said connection nugget is made of lead alloy.

14. The intercell connection assembly of claim 1 wherein said adhesive has an effective amount of viscosity to prevent adhesive flow when said adhesive is applied to and suspended from said bottom surface of said container top when said container top is in an upright orientation.

15. The intercell connection assembly of claim 1 wherein said adhesive is a paste adhesive.

16. The intercell connection assembly of claim 15 wherein said paste adhesive is a Methacrylate Adhesive.

17. The intercell connection assembly of claim 1 wherein said at least one recess of said container top occupies the same plane and battery head space as acid fill holes and a terminal through hole in said container top.

18. The intercell connection assembly of claim 1 wherein said container top has at least one channel formed on said bottom surface of said container top to receive said top edge of said at least one partition wall and said adhesive.

19. A method to reduce the size of electrochemical cells and improve the manufacture of electrochemical cells comprising:

providing a battery container formed with at least one partition wall located within said battery container to create battery intercells;

providing at least one partition wall extension on a top edge of said at least one partition wall;

providing a connector nugget to establish an electrical connection between said battery intercells;

adapting said at least one partition wall extension to receive said connector nugget by providing a portion of said at least one partition wall extension defining an extension orifice;

forming said connector nugget through and around said extension orifice;

providing and placing an adhesive onto a bottom surface of a container top; and placing said container top onto said container.

20. The method of claim 19 further comprising:

providing at least one channel on said bottom surface of said container top to receive said adhesive; and placing said adhesive in said at least one channel.

* * * * *